United States Patent [19]

Hughes

[11] Patent Number: 5,132,063
[45] Date of Patent: Jul. 21, 1992

[54] PROCESS FOR MANUFACTURING A PADDED ELEMENT

[75] Inventor: Ian L. Hughes, Windsor, Canada

[73] Assignee: Woodbridge Foam Corporation, Ontario, Canada

[21] Appl. No.: 647,648

[22] Filed: Jan. 30, 1991

[51] Int. Cl.⁵ .............................................. B29C 67/22
[52] U.S. Cl. ................................. 264/46.4; 264/46.6; 264/46.8
[58] Field of Search ................... 264/46.4, 46.5, 46.6, 264/46.8, 40.3

[56] References Cited

U.S. PATENT DOCUMENTS

| | | | |
|---|---|---|---|
| 3,258,511 | 6/1966 | Mc Gregor, Jr. | 264/46.6 |
| 3,325,861 | 6/1967 | Pincus et al. | 264/46.6 |
| 3,327,029 | 6/1967 | Pincus et al. | 264/46.6 |
| 4,923,653 | 5/1990 | Matsuura et al. | 264/46.6 |
| 4,959,184 | 9/1990 | Akai et al. | 264/46.4 |
| 4,976,414 | 12/1990 | Yanagishita | 264/40.3 |

Primary Examiner—Robert A. Dawson
Assistant Examiner—Allan R. Kuhns
Attorney, Agent, or Firm—Nixon & VanDerhye

[57] ABSTRACT

A process for manufacturing a padded element using a mold having a mold cavity and including an upper mold having an interior surface complimentary to the upper surface of the padded element and a lower mold having an interior surface complimentary to the lower surface of the padded element. The process includes placing a trim cover on the upper mold, with the trim cover comprising an inner surface and a finished outer surface in contact with substantially the entire interior surface of the upper mold, placing a liquid foamable polymeric composition on the interior surface of the lower mold and closing the upper mold and the lower mold after the liquid foamable polymeric composition expands to fill from about 50 to about 90 volume % of the mold cavity and prior to expansion of the liquid foamable polymeric composition to a point corresponding to the interior surface of the upper mold in a closed position. The liquid foamable polymeric composition expands in a direction substantially away from the lower mold and adheres to the inner surface of the trim cover. A substantial amount of expansion gases produced during expansion of the liquid foamable polymeric composition are vented prior to closing of the upper mold and the lower mold.

16 Claims, 5 Drawing Sheets

PROCESS FOR MANUFACTURING A PADDED ELEMENT

FIELD OF THE INVENTION

The present invention relates to a process for manufacturing a padded element. More particularly, the present invention relates to a process for manufacturing a unit-type padded element comprising a cushion member adhered, at least in part, to a trim cover.

BACKGROUND OF THE INVENTION

Heretofore, the methods of assembling and joining a decorative cover to the underlying padding material typically fell within one of the following techniques: mechanically retained assembly, adhesive bonded assembly and foamed-in-place (also known as molded-in-place) assembly. Such assemblies have found use as, for example, vehicle seats.

In the mechanically retained assembly, the seat cover is cut and sewn to shape, and thereafter joined to the padding material by means of metal "hog rings" or "C" clips which join molded in wires in the seat pad to sewn-in-wires in the trim cover. Alternatively, the securing means could be "hook and loop" devices (commercially available under the trade name Velcro) wherein the "hook" is molded into the seat pad and the "loop" is either sewn in or laminated onto the seat cover material. Unfortunately, this mechanically retained assembly is deficient. For example, the method of manufacturing this assembly is relatively complicated in that auxiliary wires or "hooks" must be molded into or glued on the seat pad. Further, auxiliary wire pockets or loop sheeting must be sewn in or laminated onto the seat cover material. Still further, the cost of these mechanical auxiliary means is onerous when compared to the cost of the foam padding material and the seat cover material. This results in a seat which is produced in a relatively complicated manner and at a relatively high expense.

In the adhesive bonded assembly, a molded foam seat pad or fabricated seat pad with the desired style and surface contours is located in a die or fixture. An adhesive in the form of a liquid, powder or film is applied to the surface of the pad. The seat cover material is held in a separate fixture and formed to the finished shape using one or more of vacuum (pressure), heat set and steam. The seat cover material with the die fixture is then registered to the pad. Thereafter, application of heat, steam and pressure activates the adhesive and joins the seat pad to the seat cover material. This assembly is deficient in that the method of manufacturing it requires the use of external heat, steam, vacuum and relatively high pressure. Further, this typically requires the use of a relatively expensive and toxic adhesive to bond the seat pad to the seat cover material.

In the foamed-in-place assembly, a mold is used comprising a lower section and an upper section. The seat cover material is located in the lower section of the mold and held in place with mechanical devices and/or with application of a vacuum. An impervious barrier is applied to the underside of the cover to prevent foam penetration into the cover and to permit the vacuum to form fit the cover. Thereafter, liquid polyurethane foam is poured onto the interior surface of the seat cover (i.e. onto the impervious barrier). The upper portion and lower portion of the mold are then closed thereby sealing the mold, and remain closed until the foam is set in the desired shape. During the process, the foam gives off expansion gases and expands substantially upwardly and away from the cover to fill the mold. In the finished item, the expanded foam adheres directly to the impervious barrier. This assembly is deficient in that it requires the use of external pressure and vacuum. The assembly also requires the use of an impervious backing to vacuum form the seat cover material to the lower section of the mold and to prevent bleeding of the liquid foam through the cover material. Since this method of assembly requires that no venting of expansion gases occur at the surface of the cover material, the use of the impervious backing is required with all cover materials, including vinyl and leather, which, when sewn together, become air permeable. Further, the use of the backing results in prevention of "breathing" of the finished system; this is undesirable since it reduces the comfort value of the finished system.

There have been attempts to produce covered seats wherein the impervious backing is omitted from the production process. Indeed, French patent 2,510,471 relates to the fabrication of padded elements suitable for use as seat bases or seatbacks, especially for vehicles. The manufacturing process described in the patent comprises placing the outer lining in the bottom of a mold, setting against the lining a pre-formed foam block having formed therein at least one cell or intermediate chamber, introducing a foamable mixture into the intermediate chamber to form a foam filling mass adhering to the facing portion of the lining, and removing the product from the mold. According to a preferred embodiment illustrated in FIG. 6 of the French patent, the foamable material is introduced into the intermediate chamber through a hole 14 in the upper outer shell of the foam block. The French patent purportedly does away with the need for the impervious backing utilized in the foamed-in-place assembly discussed above. However, the process disclosed in the French patent is deficient since it requires the use of a pre-formed cushion member having a substantial volume. Further, since the liquid foam is poured directly onto (i.e. no impervious backing), and thus expands in a direction substantially away from, the cover material, there is an increased likelihood that "foam densification" will occur. Foam densification is a phenomenon which occurs when young foam (i.e. foam which has just begun to expand from the liquid state) is forced to expand in an environment which is unable to accommodate the pressure build-up from gas given off from the expanding foam mass. This results in the expanding foam mass being "driven" into the cover material with a force which results in the occurrence of foam densification. When this occurs, the surface of the cover material, which, in many cases is intended to be the finished surface of the article, has a relatively hard surface which belies the objective of providing a resilient, finished article.

U.S. Pat. No. 4,618,532 discloses an upholstered seat having an air-permeable covering and a cold foam core. A process for producing the upholstered seat is also disclosed and comprises: providing a sealed split mold in which the dividing plane extends through the edge which is formed by the finished seat surface; placing a sealed air- and foam-impermeable covering material in the internal contour of the mold; clamping under tension that portion of the covering material which forms the actual seal surface in the dividing plane of the mold; placing a liquid foam in the sealed mold cavity; allowing the liquid foam to expand to fill the sealed mold cavity; and mechanically destroying the impermeable portion of the covering material. This reference concedes that adhesion between the foam and the covering material is not always achieved and thus, the use a covering material which has anchoring straps mounted on the interior surface thereof is necessary. Throughout the patent, it is disclosed that stitching seams for aesthetic purposes or for the anchoring straps must be sealed. The use of paper as an air- and foam-impermeable layer is recommended. The process disclosed by this reference is deficient since it requires the use of a sealed split mold and the use of an impermeable layer which must be mechanically destroyed after the process is completed. Further, the process is deficient since adhesion between the foam and the cover material is not consistently achieved. These deficiencies result in the requirement to use more complicated materials and extra process steps resulting in a process which is inefficient and relatively expensive to use.

In addition to the above-identified deficiencies of the prior art assemblies, extreme care must be taken with these assemblies when working with vinyl and with relatively exotic seat cover materials such as leather. For example, application of heat and steam to leather during the manufacturing of the assembly can permanently denature the leather thereby altering its texture and/or appearance. Further, the application of heat and steam can alter the gloss level of vinyl and also tends to wash out the grain surface.

It would be desirable to have a simple process for the manufacture of a padded element, which process could be used with virtually all conventional cover materials and which could be used to manufacture padded elements in a relatively efficient manner. It would be desirable if such a process could be utilized to adhere the entire finished surface of the trim cover to the cushion member.

SUMMARY OF THE INVENTION

It is an object of the present invention to provide a novel process for manufacturing a padded element which obviates or mitigates at least some of the above-identified deficiencies of the prior art.

Accordingly, in one of its aspects, the present invention provides a process for manufacturing a padded element using a mold including an upper mold having an interior surface complimentary to the upper surface of the padded element and a lower mold having an interior surface complimentary to the lower surface of the padded element, the process comprising the steps of:

placing a trim cover on the upper mold, the trim cover comprising a finished outer surface in contact with substantially the entire interior surface of the upper mold and an inner surface;

placing a foamable polymeric composition on the lower mold;

closing the upper mold and the lower mold, the foamable polymeric composition expanding in a substantially direction toward the inner surface of the trim cover and adhering thereto; and venting expansion gases produced during expansion of the foamable polymeic composition.

In another of its aspects, the present invention provides a process for manufacturing a padded element using a mold having a mold cavity and including an upper mold having an interior surface complimentary to the upper surface of the padded element and a lower mold having an interior surface complimentary to the lower surface of the padded element, the process comprising the steps of:

placing a trim cover on the upper mold, the trim cover comprising a finished outer surface in contact with substantially the entire interior surface of the upper mold and an inner surface;

placing an liquid foamable polyurethane composition on the interior surface of the lower mold;

closing the upper mold and the lower mold during expansion of the liquid foamable polymeric composition, said liquid foamable polyurethane compostion expanding in a direction substantially away from the lower mold and adhering to the inner surface of the trim cover; and wherein a substantial amount of expansion gases produced during expansion of the liquid foamable polyurethane composition are vented prior to closing of the upper mold and the lower mold.

Thus, the present process may be advantageously used to produce a finished padded element. The element comprises a cushion member to which is adhered a trim cover. The choice of foamable polymeric composition suitable for use in the present process is not particularly restricted and, most preferably, is in liquid form. The foamable polymeric composition utilized in the present process accounts for the cushion member of the padded element. It will be appreciated that, in some cases, the cushion member will be the entire cushion member of the finished padded element. Alternatively, the cushion member may be combined with a second, lower cushion member and/or a support system to provide the finished padded element.

The foamable polymeric composition virtually always emits expansion gases as it expands. In this regard, it is important to allow such gases to be vented so that complete expansion of liquid foamable polymeric composition can occur within the mold and so that the occurrence of densification of the foam and surface bleeding of the expanding mass through the trim cover are substantially reduced or eliminated. Venting of these expansion gases can be done prior to or after the upper mold and the lower mold are closed. In certain cases, it may be desirable if the expansion gases are vented prior to and after the upper mold and lower mold are closed. Preferably, a substantial amount of the expansion gases are vented prior to closing of the upper mold and the lower mold. In most instances, the amount of expansion gases vented is directly related to the volume percentage of the expanding foamable polymeric composition expressed in terms of the volume of the mold cavity (i.e. the interior volume of the mold after the upper mold and lower mold have been closed). Preferably, the upper mold and lower mold are closed after the foamable polymeric composition has expanded to fill from about 50 to about 90, more preferably from about 60 to about 80, most preferably from about 70 to about 80, volume percent of the mold cavity, provided that the upper mold and lower mold are closed prior to expansion of the foamable polymeric composition to a point corresponding to the interior surface of the upper mold.

The present process may be utilized with virtually all conventional trim cover materials. Non-limiting examples of such materials include leather, vinyl and cloth. It will be appreciated that the present process does away with the need to use trim cover material having the air- and/or foam-impervious layer required in the prior art processes.

Thus, the present process may be used to produce padded elements without the requirement of using heat, pressure and steam. In a preferred aspect of the process, the upper mold comprises a means to retain said trim cover in position. In a more preferred embodiment, the upper mold comprises a mechanical means, such as double-sided tape or the like, to retain the trim cover in place. In another more preferred embodiment, the upper mold comprises a vacuum means to retain the trim cover in place. Thus, while the use of vacuum in the present process is not a requirement, it is preferred in cases where it is desired to have a decorative, relief image on the finished padded element.

In some cases, it may be appropriate to exercise care depending on the choice of trim cover material. Specifically, if an air permeable trim cover made of, for example, cloth, is retained in place on the upper mold using a vacuum means in or connected to the upper mold, such vacuum means must be turned off prior to or immediately upon contact of the liquid foamable polymeric composition with the inner surface of the trim cover. In this, manner the occurrence of densification of the liquid foamable polymeric composition at the inner surface of the trim cover and surface bleeding of the foam through the trim cover may be substantially minimized or even eliminated.

This problem is not as prevalent when using air impermeable trim cover materials such as, for example, leather and vinyl, since, by their very nature, such trim cover materials would not translate a vacuum applied in the upper mold to the expanding masses of the polymeric composition. It will be appreciated, that, in this embodiment, it is possible to provide a vent means in the mold which operates exclusively of the vacuum means used to retain the trim cover in place on the upper mold.

In a preferred aspect of the process, the inner surface of the trim cover comprises a layer of material capable of enhancing adhesion between the trim cover and the polymeric composition after expansion. Examples of suitable such materials include a foam layer, a reticulated fabric layer and the like. Preferably, the material is a foam layer, more preferably a polyurethane foam layer. For certain trim covers (e.g. those made of vinyl or leather), it is not necessary to have a separate layer of material to achieve enhanced adhesion between the trim cover and the polymeric composition after expansion.

BRIEF DESCRIPTION OF THE DRAWINGS

Embodiments of the present invention will be described with reference to the accompanying drawings wherein like numerals designate like parts, in which.

DETAILED DESCRIPTION OF A PREFERRED EMBODIMENT

In my copending applications Ser. Nos. 07/562,924 (U.S. Pat. No. 5,089,191) and 07/562,925 (U.S. Pat. No. 5,096,639), there are disclosed alternatives which mitigate at least some of the above-mentioned deficiencies of the prior art. Specifically, in these copending applications, there is disclosed a process for manufacturing a padded element which relates broadly to the use of a liquid foamable polymeric composition to adhere a trim cover to a preformed cushion member comprising an open recess to receive the composition. The process described in these copending applications is practical and efficient for producing a padded element where only a portion of the finished surface of the trim cover is adhered to the cushion member. Unfortunately, the process is not ideal for producing a padded element where it is intended that the entire interior portion of finished surface of the trim cover is adhered to the cushion member.

Figure 1:
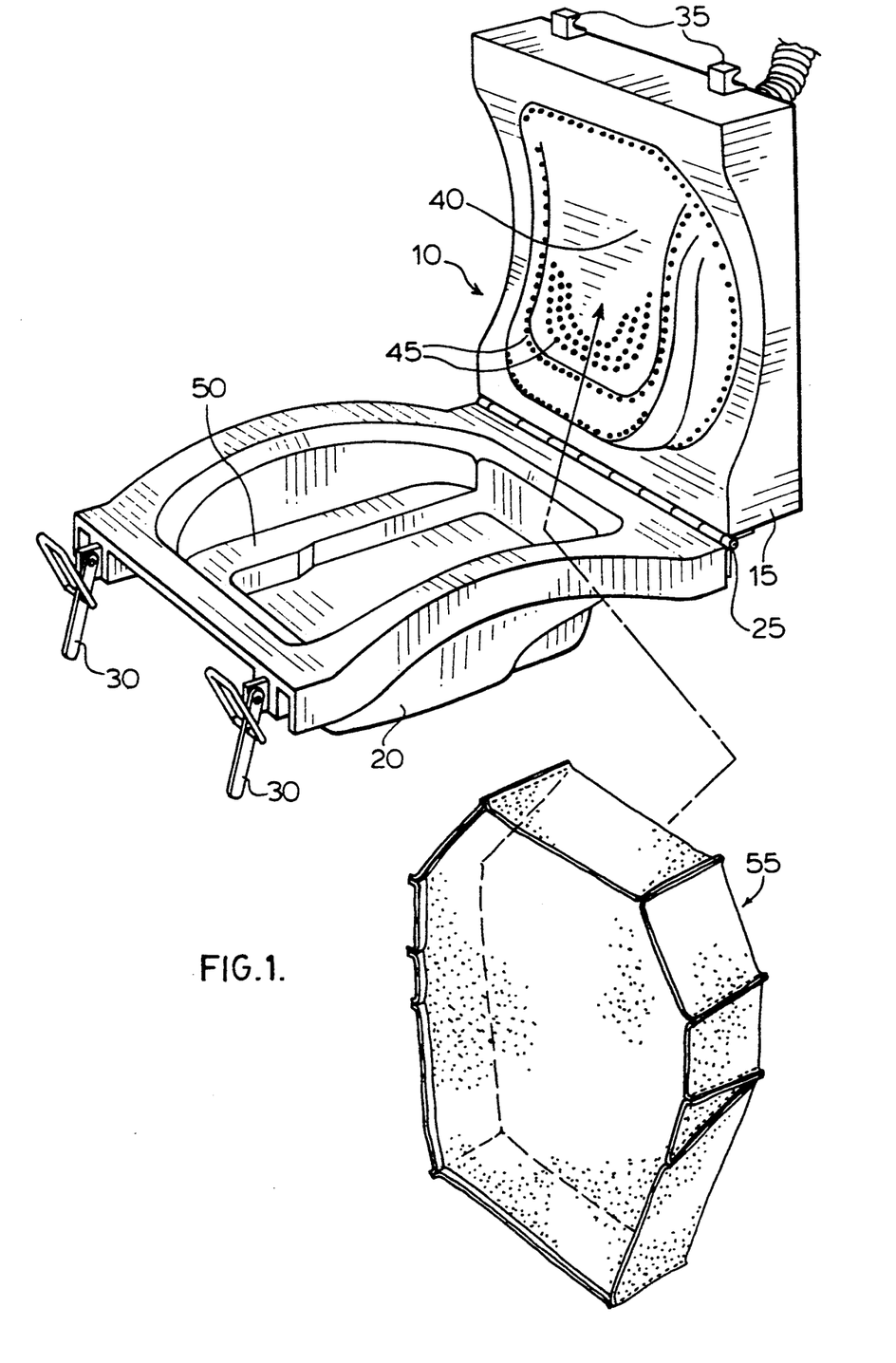
FIG. 1 is a perspective view of a mold and trim cover.

With reference to FIG. 1, there is illustrated a mold 10 for forming a padded element comprising an upper mold 15 and a lower mold 20. Upper mold 15 and lower mold 20 may be conveniently closed by hinge 25. Lower mold 20 comprises a pair of clasps 30 which are adapted to engage a pair of corresponding hooks 35 on upper mold 15. Upper mold 15 comprises an interior surface 40 which compliments the upper surface of the padded element to be formed. Interior surface 40 comprises a plurality of apertures 45. Lower mold 20 comprises an interior surface 50 which compliments the bottom surface of the padded element to be formed. Upper mold 15 is adapted to have placed thereon a trim cover 55.

Figure 2:
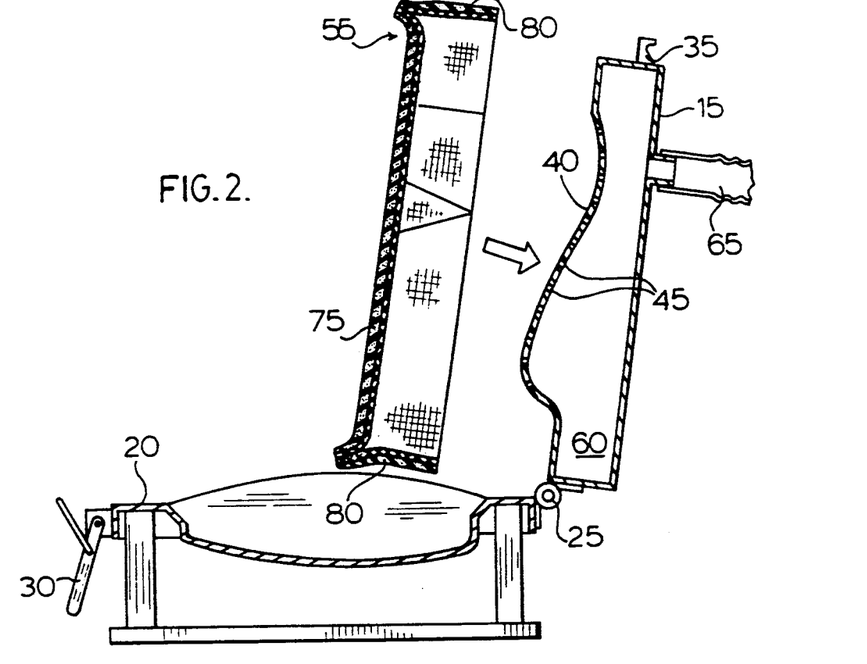
FIG. 2 is a sectional view of a trim cover being placed on the upper mold.

With reference to FIG. 2, it will be noted that upper mold 15 comprises a chamber 60 in communication with apertures 45 of interior surface 40 and a hose 65 connected to a vacuum source (not shown). Trim cover 55 comprises a finished outer surface 70, an inner surface comprising a polyurethane foam layer 75 and side panels 80. Trim cover 55 is placed on upper mold 15 in a manner whereby outer surface 70 is in contact with substantially all of interior surface 40 of upper mold 15 (see FIG. 3). This is accomplished by applying a vacuum through hose 65 to chamber 60 and eventually through apertures 45. This results in a form fit of trim cover 55 to interior surface 40 of upper mold 15.

Figure 3:
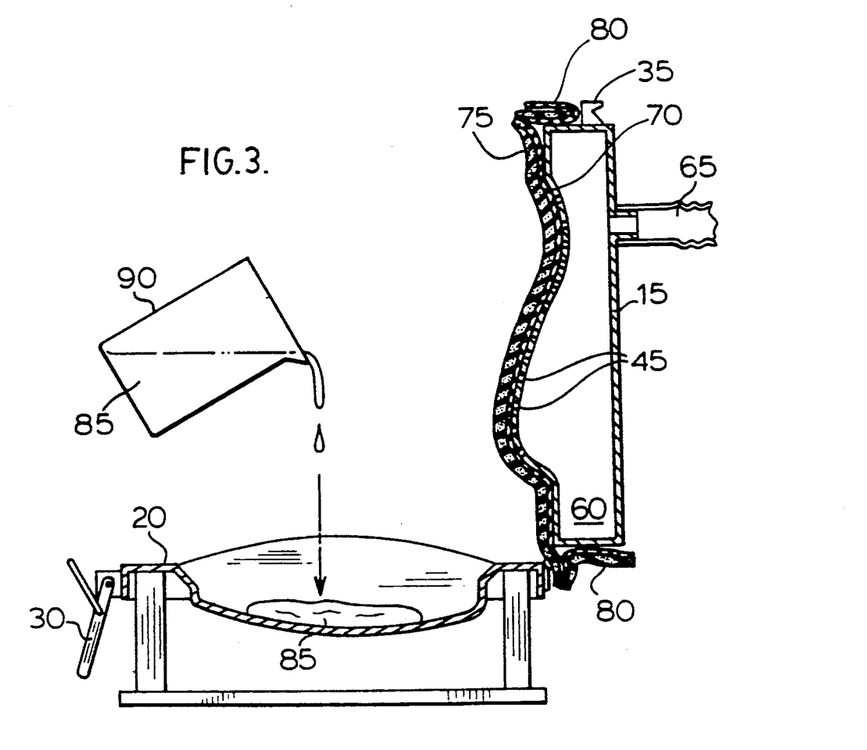
FIG. 3 is a sectional view of the liquid foamable polymeric composition being dispensed in the lower mold.

With reference to FIG. 3, a liquid foamable polymeric composition 85 is dispensed from a container 95 to lower mold 20.

Figure 4:
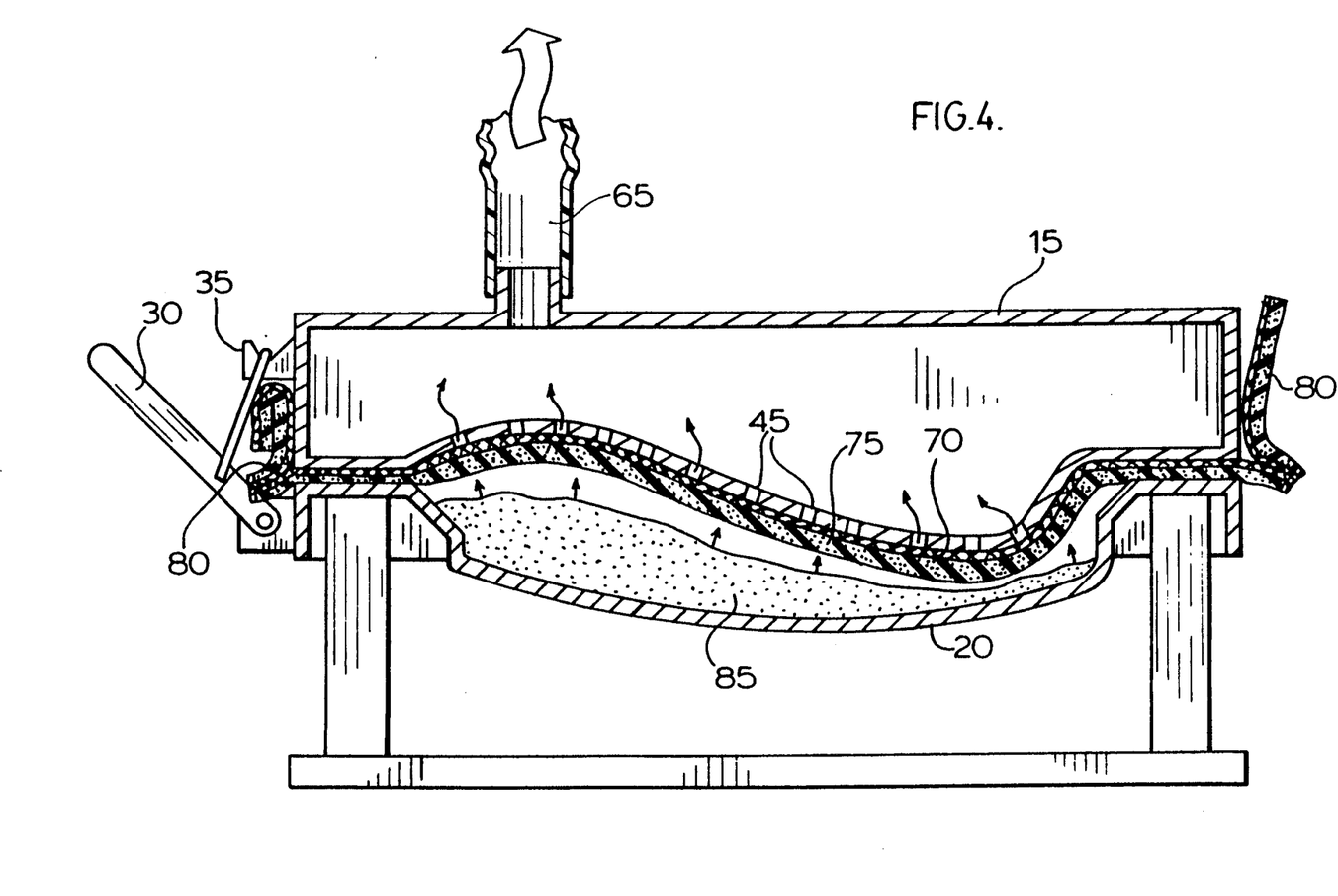
FIG. 4 is a sectional view of the closed mold.

With reference to FIG. 4, upper mold 15 and lower mold 20 are closed after composition 85 has expanded to fill from about 70 to about 80 volume percent of the mold cavity and, in any event, prior to expansion of composition 85 to a point corresponding to interior surface of upper mold 15. As illustrated, composition 85 expands in a direction substantially away from the lower mold and substantially toward polyurethane foam layer 75. By this, it is meant that a substantial amount of the composition in contact with lower mold expands in a direction substantially away from the lower mold and substantially toward the inner surface of the trim cover. Expansion of composition 85 may be assisted by the vacuum applied to chamber 60 as denoted by the arrows in apertures 45 of interior surface 40. It will be appreciated that the primary purpose of the vacuum is to form fit trim cover 55 to interior surface 40 of upper mold 15. In cases where finished outer surface 70 of trim cover 55 is air permeable (e.g. cloth), the vacuum can be used to facilitate expansion of composition 85. In cases where the finished outer surface of the trim cover is relatively air impermeable (e.g. vinyl and leather), the sole purpose of any vacuum applied to apertures 40 will be to form fit the trim cover to the interior surface of the upper mold and thus, it is preferred to utilize such a vacuum for air impermeable trim covers throughout the process. In such cases, venting of expansion gases is achieved by closing the upper mold and lower mold as late as possible, by vent means in the upper mold and/or the lower mold, the parting line between the upper mold and the lower mold, or by a combination of any of these.

Figure 5:
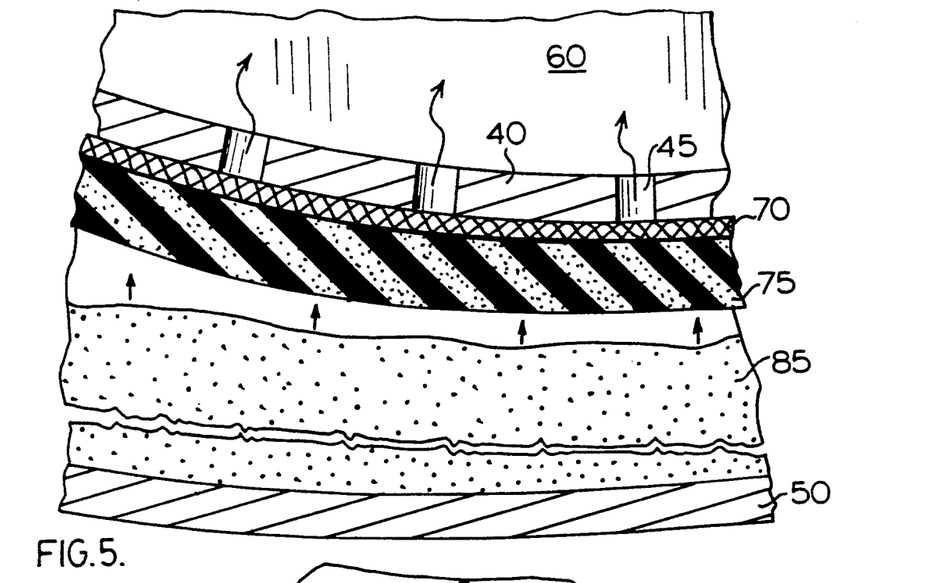
FIGS. 5, 6 and 7 are expanded sectional views of FIG. 4.
Figure 6:
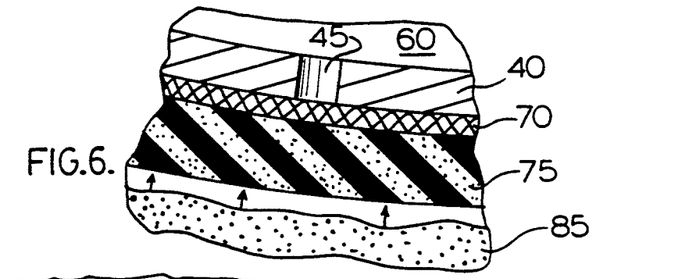
Figure 7:
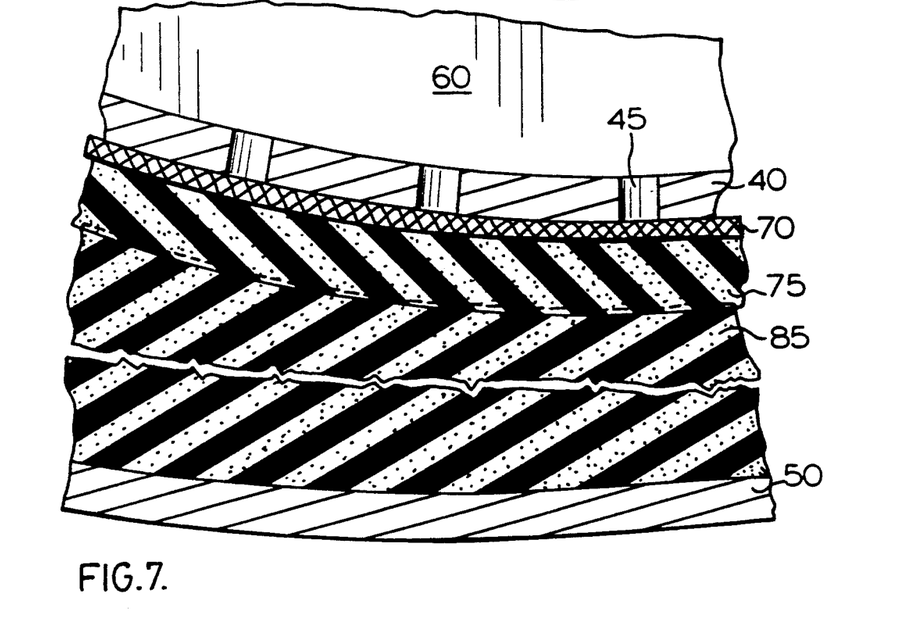

With reference to FIG. 5, as composition 85 approaches foam layer 75 of trim cover 55, the vacuum applied to chamber 60 is turned off—see FIG. 6 (absence of arrow in aperture 45). Thereafter, and with reference to FIG. 7, composition 85 completes expansion to fill substantially the volume of the mold and adheres to foam layer 75 of trim cover 55.

Figure 8:
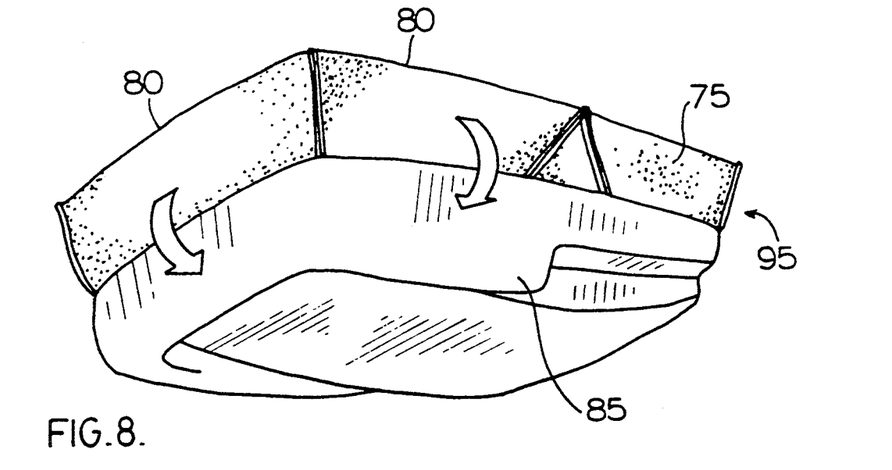
FIG. 8 is a perspective view from bottom of the padded element after it has been discharged from the mold.
Figure 9:
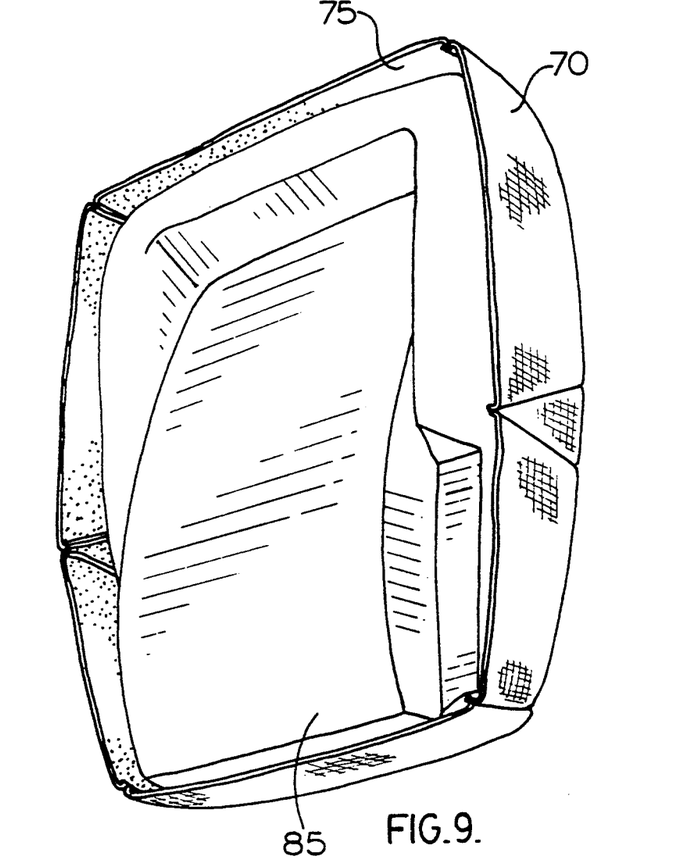
FIG. 9 is a perspective view from bottom of the finished padded element.

After composition 85 has fully expanded and adhered to trim cover 55, the finished padded element 90 (FIG. 8) is removed from mold 10 in any convenient manner. Thereafter, side panels 80 are folded over expanded foam to provide the finished padded element illustrated in FIG. 9.

The form of liquid foamable polymeric composition suitable for use in the present process and the manner by which it is dispensed into the lower mold is not particularly restricted. Preferably, the foamable polymeric composition comprises a polyurethane. More preferably, the polyurethane is a diphenylmethane diisocyanate (MDI)-based system of low index and of a high molecular weight conventional polyol. Such a system is typically completely "water blown" using highly-catalysed odourless amines and a cell regulator. Typically, this system cures at room temperature in about 3 minutes or less. Alternatively, the polyurethane is a tolylene diisocyanate (TDI)-based system of low index and of a high molecular weight conventional polyol. When such a TDI-based system is used, the cells of the foam in the finished padded element must be substantially open. Opening of such foam cells is within the purview of a person skilled in the art and can be accomplished by any convenient means such as crushing, kneading, roll pressing, chemical treatment and the like of the padded element while ensuring that the trim cover is not damaged during this step. It will be appreciated that the liquid foamable polymeric composition may comprise a mixture of MDI-based and TDI-based systems.

The present process can be used to manufacture a variety of padded elements. Non-limiting examples of such padded elements include: components of vehicle seats such as the seat cushion, the back rest and the head rest; components of other types of seat systems such as those used in boats, golf carts, snowmobiles and in office furniture; pillar covers; and padded interior door and quarter trim panels in vehicles.

Further, the present process can be used with virtually all conventional trim cover materials. Non-limiting examples of such materials include leather, vinyl and cloth. Preferably, the inner surface of the trim cover includes a foam layer made of polyurethane foam.

In a preferred embodiment of the present process, the foam layer (when present) of the inner surface and the foamable polymeric composition comprises polyurethane.

Thus, the present process can be used to produce a padded element in a convenient and efficient manner. There is no requirement to use high temperature, pressure, vacuum or steam during the present process as there is with the prior art processes discussed hereinabove.

It will be appreciated that the embodiment discussed hereinabove and illustrated in FIGS. 1-9 is not intended to limit the scope of the invention. In this regard, it will be appreciated that venting of expansion gases produced during expansion of the foamable composition may be achieved in a number of ways. For example, the expansion gases may be allowed to vent by keeping the upper mold and lower mold open until such time as a substantial amount of the expansion gases have been emitted. Typically, this translates into an expansion of the composition to fill from about 50 to about 90 volume percent of the mold cavity, provided that the upper mold and lower mold are closed prior to expansion of the foamable polymeric composition to a point corresponding to the interior surface of the upper mold. Further, it will be appreciated that, in the case where the upper mold comprises a means for fastening the trim cover in place, fastening of the trim cover does not have to take place until just prior to contact between the expanding foam mass and the interior surface of the trim cover.

Still further, it will be appreciated that the point at which the upper mold and lower mold is closed is not particularly restricted. In one embodiment of the present process, the upper mold and lower mold are closed after the trim cover is placed in the upper mold. Thereafter, the liquid foamable polymeric composition may be introduced to the lower mold by any convenient means. During expansion of the polymeric composition, expansion gases may be vented by suitable vent means in the upper mold and/or the lower mold. The provision of such vent means is within the purview of a person skilled in the art. Alternatively, and preferably, the upper mold and lower mold are closed during expansion of the liquid foamable polymeric composition. In this manner, expansion gases emitted from the polymeric composition may be conveniently and efficiently vented while the mold is open.

What is claimed is:

1. A process for manufacturing a padded element having an upper surface and a lower surface using a mold having a mold cavity and including an upper mold having an interior surface complimentary to the upper surface of the padded element and a lower mold having an interior surface complimentary to the lower surface of the padded element, the process comprising the steps of:

placing a trim cover on said upper mold, said trim cover comprising an inner surface and a finished outer surface in contact with substantially the entire interior surface of said upper mold;

placing a liquid foamable polymeric composition on the interior surface of said lower mold and allowing said liquid foamable polymeric composition to begin expanding while said upper mold and said lower mold are in an open position; and closing said upper mold and said lower mold (i) after said liquid foamable polymeric composition expands to fill from about 50 to about 90 volume percent of said mold cavity and (ii) prior to expansion of said liquid foamable polymeric composition to a point corresponding to the interior surface of said upper mold in a closed position, said liquid foamable polymeric composition expanding in a direction substantially away from said lower mold and adhering to the inner surface of said trim cover, wherein a substantial amount of expansion gases produced during expansion of said liquid foamable polymeric composition are vented prior to closing the upper mold and the lower mold.

2. The process defined in claim 1, wherein said upper mold and said lower mold are closed after said polymeric composition expands to fill from about 60 to about 80 volume percent of said mold cavity.

3. The process defined in claim 1, wherein said upper mold and said lower mold are closed after said polymeric composition expands to fill from about 70 to about 80 volume percent of said mold cavity.

4. The process defined in claim 1, wherein said upper mold comprises means to retain said trim cover in position.

5. The process defined in claim 1, wherein said upper mold comprises mechanical means to retain said trim cover in position.

6. The process defined in claim 1, wherein said padded element is a component of a vehicle seat.

7. The process defined in claim 1, wherein said polymeric composition is a polyurethane composition.

8. The process defined in claim 1, wherein said upper mold comprises vacuum means to retain said trim cover in position.

9. The process defined in claim 8, wherein said trim cover is substantially air impermeable.

10. The process defined in claim 8, wherein the finished outer surface of said trim cover is made of at least one of leather and vinyl.

11. The process defined in claim 8, wherein said vacuum means is turned off prior to or immediately upon contact of said polymeric composition with the inner surface of said trim cover.

12. The process as defined in claim 11, wherein said trim cover is substantially air permeable.

13. The process defined in claim 11, wherein the finished outer surface of the trim cover is made of cloth.

14. The process as defined in claim 1, wherein the inner surface of said trim cover comprises a layer of material capable of enhancing adhesion between the trim cover and said polymeric composition.

15. The process defined in claim 14, wherein said material is a foam layer.

16. The process defined in claim 14, wherein said material is a reticulated fabric.

* * * * *